United States Patent [19]

Hooper

[11] Patent Number: 4,689,765

[45] Date of Patent: Aug. 25, 1987

[54] GROUPS OF TAG SIGNALS FOR DATA STORE IN MULTI-PLANE SET OF BUFFERS

[75] Inventor: Donald F. Hooper, Shrewsbury, Mass.

[73] Assignee: Digital Equipment Corporation, Maynard, Mass.

[21] Appl. No.: 461,996

[22] Filed: Jan. 28, 1983

[51] Int. Cl.⁴ .............................................. G06F 7/08
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 4,038,643 | 7/1977 | Kim | 364/200 |
| 4,318,175 | 3/1982 | Hawley | 364/200 |
| 4,519,033 | 5/1985 | Vaughn et al. | 364/900 |
| 4,521,851 | 6/1985 | Trubisky | 364/200 |

*Primary Examiner*—Archie E. Williams, Jr.
*Assistant Examiner*—Emily Yue Chan
*Attorney, Agent, or Firm*—William E. Cleaver

[57] ABSTRACT

Address circuitry generates groups of tag signals, and each group is associated with a data word in a data processing device. A portion of the tag signals defines an addressable location in a storage device and another portion of the tag signals defines an operational identification of its associated data word. As data words (i.e., instruction words, operands, etc.) are fetched from memory they are decoded, if necessary, or made ready, (for use by the circuitry which executes the operations intended for such instructions, operands, etc.), and are stored in a multi-plane set of buffers. Each of said buffers has a plurality of address locations, corresponding to the address locations defined by said first portions of said tag signals, and each of said planes is selectable by said other portions of said tag signals. Accordingly, all of the data words stored in one plane have the same operational purpose, for example such as each being first operand, and each data word addressable by the same address (albeit in different planes) is related to the same program manipulation. In view of the tag signals being associated with the data words, the fetching, decoding and storing of the data words can be accomplished in a non-sequential fashion, with reduced hardware and without the delayed actions which have accompanied pipeline operations (of the prior art), when one or more of the data manipulating stages, in such pipeline operations, is busy.

10 Claims, 1 Drawing Figure

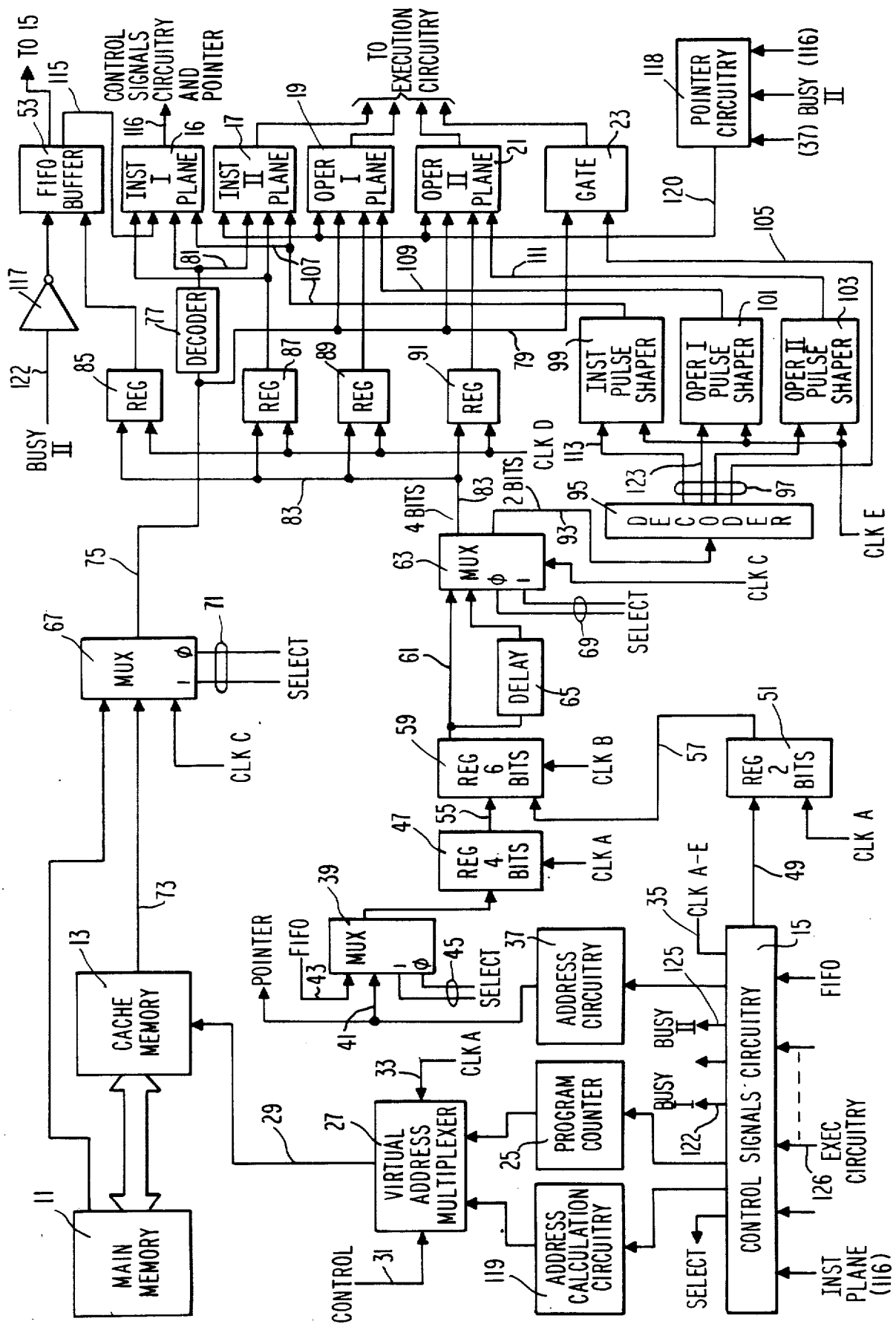

GROUPS OF TAG SIGNALS FOR DATA STORE IN MULTI-PLANE SET OF BUFFERS

BACKGROUND OF THE INVENTION

The concept of doing more than one data processing operation at the same time and/or the concept of not waiting until a particular data processing operation is finished before starting a subsequent data processing operation, is not new in the data processing art. One such popular example of structure permitting concurrent operations, or nearly concurrent operations, is that of a pipeline system, which has a plurality of registers interspersed, along a path, in between pairs of data manipulation circuits. In such systems, data entering a first data manipulation circuit would be operated thereupon and then stored in a first register immediately downstream from said first data manipulation circuit.

In a subsequent next period of time, information from said first register would be transmitted to a second data manipulation circuit whereat a second data processing operation would take place. Then the results would be stored in a second register device which is located immediately downstream from said second data manipulation circuit. In that same time frame, or in very nearly that same time frame, the first data manipulation circuit would perform a data operation on a second data word and then store the results in said first register. As the words advance along the data path, i.e., along the pipeline, into and out of the data manipulation circuits and into and out of the interspersed registers, many operations are accomplished either simultaneously or very nearly simultaneously. However, if any particular operation on a data word takes longer than an intended concurrent operation on a second, or subsequent, data word then the data manipulation circuit handling the second data word has to halt its operation, or at least not store its results, until the first operation is completed. Such an interruption of the operation at any stage causes a wave-like halting effect on all of the upstream stages and the desired concurrent operations are diminished or even nullified.

A major part of accomplishing an operation, in an electronic data processing system, is related to fetching data words from memory for use in data processing operations. For instance, fetching an instruction from memory, analyzing the information contained in the instruction, and fetching operands to be manipulated in accordance with the analysis of the instruction information is normally required to accomplish a program step. When the data words have been brought from memory and staticized, or made ready, then the execution circuitry, or execution equipment, can manipulate the operands, store the results, and get ready for manipulating the next set of data words. In a pipeline operation, part of the effort is directed to making the data words ready for a later manipulation. Hence if the pipeline operation is slowed down, or impeded, as described above, the time to get the data words ready for manipulation is increased, when compared with a lessor amount of time that might have been necessary, had there been no impediments along the pipeline data path. In the present invention the data words are made ready for use in a manipulation and are either directly used in that manipulation or are temporarily stored. The tag information associated with the data words improves the system's ability to store such data words and improves the system's ability to get rapid access of such data words.

SUMMARY OF THE INVENTION

The present invention provides circuitry which fetches data words from memory, with such data words being instructions, operands and the like. As the data words are fetched, the present circuit generates a tag, i.e., a group of tag bits. In the preferred embodiment the tag bit group consists of six bits. Four of said bits represent one of sixteen locations, or addresses, in a storage means. The remaining two bits identify one of four possible operational characteristics related to the data words. In the preferred embodiment, there are three planes of temporary storage means and each plane is identified by one of said operational characteristic, or one of the four combinations of the two bits, mentioned above. Accordingly, each data word which is associated with an intended particular operation, or an intended data manipulation, is stored in a location with the same address while each of such data words is located in a different plane in accordance with its operational identification. It follows that the system operates such that when a data manipulation is to take place in the execution circuitry, the temporary storage means can be addressed by a single address and three or more data words, necessary to the intended data manipulation, will be immediately accessible to the execution circuitry.

The features and objects of the present invention will be better understood in view of the following description taken in conjunction with the drawing.

BRIEF DESCRIPTION OF DRAWING

The only drawing is a block schematic diagram of the present system.

DESCRIPTION OF THE PREFERRED EMBODIMENT

In the drawing there is shown a main memory 11 and a cache memory 13. It should be understood that the main memory 11 and the cache memory 13 are memory devices which are found in a great many electronic data processing systems and they are well understood. The main memory 11 and the cache memory 13 are not described in detail in this description because as mentioned above they are well known and because such structure is not basic to the invention being described and claimed. The main memory is normally a relatively slow access device. The cache memory usually houses the data words which are going to be used many times and because of the particular circuitry used, the cache memory is a relatively fast access memory. The data paths shown in the drawing indicate that the technique for addressing main memory would be through the cache memory and indeed for the purposes of this description that is correct, but it should be understood that the main memory could be directly addressed if that were necessary.

There is also shown in the drawing a control signals circuitry box 15. As is true in many electronic data processing systems the control circuitry is not all housed in one location but is spread throughout the system. For purposes of discussion it simplifies the description to show all the control signal circuitry in one location. The generation of control signals is well understood in the electronic data processing art and will not be described in this description.

On the right hand side of the drawing the outputs of the various memory planes 17, 19, and 21, as well as the output from the gate 23, are shown going to execution circuitry. The execution circuitry will be understood to mean the portion of the central processor unit (CPU) which actually manipulates the operands and/or manipulates whatever other information signals may be requested by an instruction.

Let us consider the situation where the electronic data processor, with which the present inventive circuitry is used, has been turned on and the "power up" circuitry has properly performed to provide the necessary power to all of the components in the system. Further, consider that the components which have to be reset have been reset to their proper conditions, and consider that the system has been staticized and loaded with the proper program information so that the system is about to undertake some form of program operation. In accordance with the foregoing circumstances the program counter 25 will be in the home position, or the zero position, and it will transmit its zero position information to the virtual address multiplexer 27. The virtual address multiplexer 27 will operate on the data information from the program counter 25 and will generate data information on the line 29 which will select an address in the cache memory 13. The address in cache memory 13 is the address whereat the programmer has stored the information, or the instruction, that he wants to be first brought into the system. It should be understood that if, in fact, the first instruction to be brought into the system were in the main memory, then the virtual address multiplexer 27 would provide an address which the cache memory would bypass and transmit into the main memory. It should also be understood that the program counter 25 is a collection of devices which can be obtained commercially and in the preferred embodiment it is composed of parts numbered 100180, 100179, 100142 and 100155 manufactured by the Fairchild Company. It should also be understood that the virtual address multiplexer 27 is a commercial item, which can be obtained from a number of manufacturers, and in the preferred embodiment is made up of parts numbered 100171 and 100155 manufactured by the Fairchild Company. It will be noted that the virtual address multiplexer 27 receives a control input signal on line 31 and a clock A input signal on line 33. The clock A signal on line 33 comes from the control signals available on lines 35. Lines 35 are identified as providing clock signals A-E, but other clocks can be present. In the present description, we will assume that there is clock signal circuitry within the control signals circuitry 15 which generates all the proper clock signals, in the proper time frames, to have the system operate synchronously and sequentially in accordance with the proper steps that should be taken. Throughout the description there will be reference to clock signals A, B, C, D, and E and those clock signals are sequential in time. As will become better understood hereinafter, clock signals A through E will clock certain devices, or make certain devices operate, at the proper times. The control signal on line 31 which is transmitted to the virtual address multiplexer 27 provides a means of controlling the virtual address multiplexer such as selecting certain operations therefrom, or selecting certain manipulations therefrom, which enable the programmer to provide different cache memory locations for different program counter positions. This technique is well understood in the electronic data processing art and no further description thereof is deemed necessary.

At the same time that the foregoing operation is taking place, the address circuitry 37 has received signals from the control signal circuitry 15. These last mentioned signals indicate to the address circuitry that the system is in the first program counter position and the address circuitry provides information to the first tag multiplexer 39. The address circuitry 37 also provides information to the pointer circuitry 118 as will be discussed later on. The information provided to the first tag multiplexer 39 consists of four bits, each combination of which represents one of sixteen locations in the memory planes 16, 17, 19, and 21. To state it another way, the memory planes, or buffers 16, 17, 19, and 21 each has at least sixteen address locations. While in the preferred embodiment sixteen is the number of locations that has been used, it should be understood that larger or lesser numbers of temporary storage addresses could be used within the spirit of the invention. The address circuitry 37 generates the four bits which are commensurate with the program counter position but need not be numerically similar or identical. In other words, if for some reason there were some advantage, the zero position in the program counter could be represented by the fifth or the sixth position in any one of the memory planes 16, 17, 19, and 21. In the preferred embodiment the zero position in the program counter is the first position in the memory planes 16, 17, 19, and 21.

The four bits are transmitted on line 41 to the multiplexer 39 and therethrough to the register 47. Now, as can be gleaned from the drawing, there is another input to the multiplexer 39 on line 43. The information on line 43 comes from a FIFO register 53 and the description of that operation will be included below. There are two other inputs to the multiplexer 39 which are transmitted on the lines 45. As can be determined from an examination of the drawing, the lines 45 are identified as select lines and come from the control signals circuitry 15. The signals on the select lines, select either a zero position or a one position in the multiplexer 39. Such a selection determines whether the information on line 41, or the information on line 43 is transmitted through the multiplexer 39.

Simultaneously with the foregoing operation there are two bit signals transmitted on lines 49 to the register 51. The two bit signals are generated by a counter, or some other well known means within the control signals circuitry and provide the basis for four combinations. Accordingly, the two bits provide the basis for identifying four operational characteristics of the data words being fetched from memory. To be more explicit, in the preferred embodiment the data words fetched from memory may be an instruction, or an operand one, or an operand two, or a plurality of operands. Such plurality of operands have been deemed necessary by the execution circuitry after the execution circuitry has manipulated the operand one and operand two in accordance with the instruction information. It should be understood that while two bits are used to identify four operational characteristics of the data words, if the system needed more than four data word operational identifications, more than two bits could be used and such a concept would be within the spirit of the present invention. It can also be determined by examining the drawing that there is a clock A signal transmitted to both the registers 47 and 51. Hence, at clock A time there are four bits transmitted from the register 47 on line 55 and two bits transmitted from the register 51 on line 57. These six bits are transmitted to the register 59 where they are held until clock B time. At clock B time the six bits are transmitted from the register 59 along the line 61 to the second tag multiplexer 63 as well as to the delay device 65. When the data word is being addressed, the control circuitry 15 determines whether or not the address is in the cache memory 13 or in the main memory 11. It will be recalled that the main memory 11 is a relatively slow access memory and therefore if the data word is to be fetched from the main memory, it will take longer for that data word to get to the third tag multiplexer (MUX) 67 than it would if that data word were coming from the cache memory 13. Since the control circuitry determines from whence the data word is being brought, it provides one of two select signals on the lines 69 and hence, MUX 63 will accept the six bits either from line 61 or alternatively from the delay device 65. In other words, if the data word is being fetched from the cache memory 13, then the MUX 63 is conditioned to accept the six bits on line 61, while if the data word is coming from the main memory 11, then the MUX 63 will accept the information from the delay device 65. It follows that at some time, prior to clock C time, the MUX 67 will hold the bits representing the data word being fetched while the MUX 63 will hold the six bits representing the tag associated with that data word. In a preferred embodiment the delay device 65 delays the six bit signals for 200 to 250 nanoseconds, and any well-known delay line or buffer may be used. If the difference in the access time between accessing the main memory and the cache memory is other than in the range of 200 to 250 nanoseconds, then the delay device 65 will be designed to provide that delay.

With respect to the circuitry described up to this point, it should be understood that the address circuitry 37 is a commercial item and can be obtained from a number of manufacturers. In the preferred embodiment the address circuitry 37 is Part number 100136 manufactured by the Fairchild Company. It also should be understood that the multiplexers 39, 67, and 63 are also commercial items and in the preferred embodiment are parts numbered 100155 manufactured by the Fairchild Company. In like fashion, the registers 47, 51, and 59 are commercial items and in the preferred embodiment are parts numbered 100141 manufactured by the Fairchild Company.

At clock C time, the multiplexer 67 has been conditioned, through the select information on line 71, to pass either the bit signals from the main memory, or the bit signals from the cache memory. In the system in which the present invention is used, the data words are composed of thirty-six bits, but it should be understood that other numbers of bits might be used. In this description we will consider that prior to clock C time, the data word came from the cache memory and therefore thirty-six bit signals, which were transmitted on line 73, were passed to the MUX 67. At clock C time those thirty-six bit signals are transmitted on line 75. The thirty-six bit signals on line 75 go to the decoder 77, as well as to the inputs of the operand one plane 19, the operand two plane 21, and the gate 23. In the decoder 77 the thirty-six bits are expanded (or contracted if that is deemed desirable), to the number of bits which will be necessary to effect an instruction in the execution circuitry. If we assume that the thirty-six bits are in fact expanded to sixty bits, (and it should be understood that they could be expanded to any number of bits) then we find that the sixty bits are present on the lines 81 awaiting a "write in" operation to the instruction planes 16 and 17 when the proper address and control information has been transmitted to the instruction memory planes 16 and 17. The same instruction bits in their thirty-six bit form on line 75 are awaiting entry into the operand one plane 19 and the operand two plane 21 but as will become apparent hereinafter, those planes will not be conditioned to accept that information. At the time that the instruction word is brought from memory, nothing gets stored in the operand one plane 19 or the operand two plane 21. In a similar fashion, the thirty-six bit signals are transmitted to the gate 23 in an attempt to pass through that gate, but that gate will not be conditioned at the instruction time as will become apparent hereinafter.

In response to the clock C signal being applied to the MUX 63, four bits are transmitted on lines 83 to the registers 85, 87, 89, and 91. Simultaneously therewith two bits are transmitted along the lines 93 to the decoder 95. In the decoder 95, the two bit signals are decoded into four voltage conditions, three of which are transmitted on the lines 97 to the pulse shapers 99, 101, and 103. The fourth condition signal is transmitted on the line 105 to the gate 23.

If we assume that the four bits represent the first position, or first address location, in each of the planes 16, 17, 19, and 21, then that combination of bits will be found in each of the registers 85, 87, 89, and 91. At clock D time the four bit signals will be passed from the registers 85, 87, 89, and 91 respectively to the FIFO register 53, the instruction memory plane 16 and 17, the operand one plane 19 and the operand two memory plane 21. Accordingly, at the end of clock D time the instruction memory planes 16 and 17 will be ready to receive the decoded instruction information in their respective first memory location. However, instruction planes 16 and 17 will not actually accept and store that instruction information until they receive a signal on line 107 from the pulse shaper 99. The memory devices 19 and 21 are also waiting to accept instruction information and in the proper address location but are not ready to accept that information unless there are respectively signals on lines 109 and 111 to condition those memory devices. The gate 23 would pass the raw thirty-six instruction bit signals if the gate were conditioned by a signal on line 105.

At clock E time, only the pulse shaper 99 is conditioned because when the two bits are decoded in a decoder 95, only the line 113 has a voltage signal on it and therefore only the pulse shaper 99 provides an output signal on line 107. The signal on line 107 fully conditions the instruction memory planes 16 and 17 to accept the decoded information and, hence, store the instruction at the first memory location in the instruction planes 16 and 17. Since the pulse shapers 101 and 103 do not provide signals, the information which is attempting to be stored in the operand one plane 19 and the operand two plane 21 does not get stored therein. Nor does the gate 23 pass any information because there is no voltage output signal on line 105. It was indicated earlier that the four bits were transmitted from the register 85 to the FIFO buffer 53.

Before discussing the operation of the FIFO buffer 53, it should be noted that there is an instruction one memory plane 16 and an instruction two memory plane 17. These two instruction memory planes are loaded from decoder 77 in response to control signal from register 87 and pulse shaper 99. However, the readout control signal for each of the instruction planes 16 and 17 differs. Instruction plane 16 is read out by an output signal from FIFO buffer 53, while instruction plane 17 is read out in response to a signal on line 120 from the pointer circuitry 118. The FIFO buffer 53 is a first in - first out buffer which accepts the address information (the four bits) for each instruction as it is brought from memory. The FIFO buffer serves to send part of the decoded information from instruction plane 16 back to the address calculation circuitry 119, through the control signals circuitry 15 when the address calculation circuitry is free to calculate the addresses of operands associated with the decoded instruction. As can be seen in the drawing, the control signals circuitry 15 provides a Busy I signal on line 122 when the address calculation circuitry 119 is busy. When the address calculation circuitry 119 is not busy, then a low signal will be transmitted on line 122 to the invertor 117 to provide a high signal on line 127 to the FIFO buffer 53. In response to a high signal on line 127, the FIFO buffer 53 will provide the next address to the instruction I plane 16 and the next decoded instruction will be sent to the control signals circuitry 15 to ultimately be manipulated in the address calculation circuitry 119 to provide the next operand address required by the instruction.

The instruction II memory 17 plane is associated with providing decoded instructions to the execution circuitry along with the operands from planes 19 and 21 which are required by that instruction.

As was just mentioned, the loading of the operand one plane 19 and the operand two plane 21 normally takes place in response to the decoded instruction information being transmitted to the control signal circuitry 15 and therefrom to the address calculation circuitry 119. In the address calculation circuitry 119 certain portions of the decoded information signals are manipulated to calculate or determine addresses for an operand one data word and an operand two data word. This information is transmitted to the virtual address multiplexer 27 and therefrom either to the cache memory 13 or to the main memory 11 through cache memory 13, as was described earlier with respect to bringing an instruction data word either from cache memory or from the main memory. In the normal progression of steps, the operand one data word would be brought over first in time after the instruction data word and if we assume that the operand one data word comes from the cache memory 13, it will be transmitted on the line 73 to the multiplexer 67. However, it should be noted that, should the operand one data word come from main memory, and the operand two data word come from cache memory, the operand two data word may be brought over first in time. In our example, the operand one information will remain in the multiplexer 67 until clock C time.

Prior to clock C time, the address circuitry 37 will provide the same four bits that were supplied to identify the instruction address, previously described, to the multiplexer 39. The system wants to have the same four bit address for this particular operand one, because this particular operand one (that is the operand one presently being fetched from memory to be used by the execution circuitry) will be manipulated by the execution circuitry in response to the instruction which is located in instruction plane 17 at the same four bit address which is now going to be the address for this particular operand one. The proper select signal will be provided from the control signal circuitry to the multiplexer 39 to transmit the four bits from the multiplexer 39 to the four bit register 47. The four bits will remain in the register 47 to be read therefrom in response to a clock A signal being applied to the register 47.

Simultaneously, with the four bit signals being transmitted from the address circuitry 37, there will be two bit signals transmitted on line 49 to the two bit register 51. The two bit signals, depending upon their binary zero and binary one combination, will identify that the data word which is being brought from the cache memory, at this time, is, in fact, an operand one data word. The two bit signals will remain in the register 51 until a clock A signal is applied thereto. At clock A time the six bit signals will be transmitted from the registers 47 and 51 to the register 59. The six bits will remain in the register 59 until clock B time which occurs after clock A time. At clock B time the six tag bit signals will be transmitted along the lines 61 or through the delay device 65, in a fashion similar to that described in connection with the six bit tag which identified the instruction data word. In the example we are considering, we are fetching the data word from the cache memory and therefore the select one signal will be provided to the multiplexer 63 to permit the information on line 61 to be transmitted directly into the multiplexer 63.

At clock C time, the multiplexer 67 reads the data word which, in our example, is made up of thirty-six bits and which, at this time, represents an operand one. The thirty-six bit signal is transmitted to the decoder 77 as well as to the input circuitry to the operand one memory plane 19 and to the operand two memory plane 21. In addition, the thirty-six bit operand one data word is transmitted to the gate 23. In a fashion similar to that described in connection with the instruction data word, information signals will only enter the operand one plane 19 and that will only occur in response to a signal on line 109 from the pulse shaper 101. When the two bits are transmitted from the multiplexer 63 along line 93 to the decoder 95, the second line from the decoder 95, that is line 123, will be the only output line with a signal thereon. Therefore at clock E time, the only signal available will be applied to memory plane 19. Accordingly, the thirty-six bits representing operand one, will be stored in the operand one plane 19 and they will be stored at the same address, that is at the number one address, that the instruction data word was stored.

The operation is similar for storing the second operand, or operand two in plane 21. In the event that when the two operands are manipulated (in accordance with the instruction information, for this particular step of the program, or series of steps for the program), the results of that manipulation requires a number of other operands, those operands will be transmitted directly along line 79 to the gate 23. In such an event, the system will provide the fourth condition signal from the decoder 95 and hence there will be an output signal on line 105 to condition the gate 23. There is no need to store the fourth condition data words because those data words are immediately required and the necessity is determined in a dynamic sense. In other words, the system is in the midst of performing an operation which requires those data words and so they come directly through the gate 23 into the execution circuitry to be manipulated.

Thus far, we have dealt with loading the memory planes 17, 19, and 21 with decoded instruction information and operand one and operand two all of which are to be used by the execution circuitry in a program manipulation. The means to read that information from the planes 17, 19, and 21 is provided by the pointer circuitry 118. The pointer circuitry 118 is not basic to the present invention, but is used in the system with which the present invention is employed to provide flexibility. In particular to permit the system to alter a program routine in response to decoding an instruction or in response to a result of the execution circuitry. In the preferred embodiment the pointer circuitry includes a buffer means which operates with microcode circuitry. The pointer circuitry 118 is a combination of devices and in the preferred embodiment is made up of parts numbered 100141, 100145, 100155, and 100164 manufactured by the Fairchild Company. The logic circuitry to accomplish the pointer purpose can comprise a table look up means, i.e., properly loaded with RAM's and/or ROM's or can comprise a microprocessor.

As can be gleaned from the drawing, one of the input lines, or channels, to pointer circuitry 118 is from the address circuitry 37. Each time that address circuitry 37 generates a new address it is loaded into the pointer circuitry 118. Also, as can be gleaned from the drawing, one of the input lines, or channels, to pointer circuitry 118 is from instruction I plane 16 on line 116. When the FIFO buffer addresses the plane 16 a portion of the decoded instruction information is sent to the pointer circuitry 118. In the pointer circuitry 118, the decoded signals condition the microcode circuitry and in response the pointer circuitry arranges the address signals which it received on line 37, so that when the execution circuitry is no longer busy, the pointer circuitry 118 will address the planes 17, 19, and 21 to provide an instruction and two operands for the next program step. Such an addressing step will be in conjunction with the arrangement of the addresses in the pointer circuitry by the decoded instruction information.

It should be understood however, that the pointer circuitry 118 will not respond until the Busy II signal is negated. When the execution circuitry is manipulating some operands, or the like, the Busy II signal on line 125 is high. When the execution circuitry completes the manipulation and is ready to do another step, a signal so indicating is transmitted on line 126 to provide a low signal, or a "not busy" signal, on line 125. The "not busy" signal on line 125 provides a four bit address signal on line 120 which in turn causes an instruction to be read from plane 17, an operand one from plane 19 and an operand two from plane 21.

It should be understood that while the present system is described to be operative in conjunction with a six bit tag, that other numbers of bits could be used in the tag if, in fact, it is desirable to identify more than sixteen address locations and it is desirable to identify more than four operational characteristics. The present system allows the instruction information as well as the operand information to be brought over directly and made ready for immediate accessibility upon the completion of a prior operation manipulation.

While it has not been described in detail, it should be understood that by employing appropriate control circuitry sequence methods, the present system can fetch four instructions, one after the other without waiting for their operands to be determined through the address calculation circuitry. The addresses for the operands are determined subsequently by using decoded signals from the instruction plane to indirectly generate control signals to the address calculation circuitry 119. Eventually the planes 17, 19, and 21 are loaded with four instruction data words and four operand one data words and four operand two data words.

By using the two part tag to provide two kinds of identifications of the data words that are fetched from memory the system can load a number of associated memory planes such that all of the data words that are related to the same program operation have the same memory address but are loaded in different planes depending upon the operational characteristic of the data words brought from memory. In this way, the present system eliminates the impediments found in the prior pipeline systems as described above and makes all of the information, which would be necessary, available for immediate manipulation. Such information signals can be available in parallel at the time a prior progam manipulation has been terminated. In this way, the program steps are speeded up or more rapidly accomplished.

I claim:

1. An arrangement for increasing the speed of executing program operations in an electronic data processing system where said electronic data processing system has means for executing operations in response to and on information signals and has memory means formed to store groups of information signals as well as control signal means formed to provide control signals, some of which cause said groups of information signals to be brought from said memory means, comprising in combination:

first circuitry means connected to said memory means to receive and transmit said groups of information signals in response to control signals applied thereto;

second circuitry means formed and connected to receive certain of said control signals to generate different groups of tag signals respectively for different groups of said information signals and with each group of said tag signals designating both an address location and an operational characteristic related to the group of information signals for which they were generated;

third circuitry means connected to said second circuitry means to receive said tag signals and formed to route a first portion of each group of said tag signals which identifies an address location related to the information signals for which they were generated and formed to route a second portion of each group of said tag signals which identifies an operational characteristic related to the information signals for which they were generated;

a plurality of information signals storage means each formed to store information signals and formed to have storage locations corresponding to different ones of said address locations and each storage means corresponding to a different one of said operational characteristics;

fourth circuitry means connecting said plurality of information signals storage means to said means for executing operations and to said first and third circuitry means whereby each of said groups of information signals is received from said first circuitry and stored in said information signals storage means according to address information received from said third circuitry and according to operational characteristic information received from said third circuitry and is readily usable by said means for executing operations.

2. An arrangement for increasing the speed of executing program operations according to claim 1 wherein each group of said information signals is a data word which represents instructions and alternatively represents operands to be manipulated by said means for executing operations in accordance with information in an instruction data word.

3. An arrangement for increasing the speed of executing program operations according to claim 1 wherein each group of tag signals is comprised of six bits and wherein four bits of said six bit tag represent one of sixteen address locations and wherein the remaining two bits of said six bit tag represent one of four operational characteristics.

4. An arrangement for increasing the speed of executing program operations according to claim 2 wherein said third circuitry includes delay means to delay the routing of any group of said tag signals in the event that its associated data word is delayed in being received by said first circuitry means.

5. An arrangement for increasing the speed of executing program operations according to claim 2 wherein a plurality of data words are needed by said means for executing operations, and wherein each data word is identified with a same group of tag signals which indicates the same address location for each such data word and which indicates a different operational characteristic for each such data word.

6. An arrangement for increasing the speed of executing program operations according to claim 3 wherein each of said information storage means includes at least sixteen memory locations and wherein said plurality of information storage means includes at least three planes with each plane identified with a different operational characteristic.

7. An arrangement for increasing the speed of executing program operations in an electronic data processing system where said electronic data processing system has means for executing operations in response to and on information signals and has memory means formed to store groups of information signals as well as control signal means formed to provide control signals, some of which cause said groups of information signals to be brought from said memory means, comprising in combination:

first circuitry means connected to said memory means to receive and transmit said groups of information signals in response to control signals applied thereto;

second circuitry means formed and connected to receive certain of said control signals to generate different groups of tag signals respectively for different groups of said information signals and with each group of said tag signals designating both an address location and an operational characteristic related to the group of information signals for which they were generated;

third circuitry means connected to said second circuitry means to receive said tag signals and formed to route a first portion of each group of said tag signals which identifies an address location related to the information signals for which they were generated and formed to route a second portion of each group of said tag signals which identifies an operational characteristic related to the information signals for which they were generated:

a plurality of information signals storage means each formed to store information signals and formed to have storage locations corresponding to different ones of said address locations and each storage means corresponding to a different one of said operational characteristics;

fourth circuitry means connecting said plurality of information signals storage means to said means for executing operations and to said first and third circuitry means whereby each of said groups of information signals received from said first circuitry and is stored in said information signals storage means according to address information received from said third circuitry and according to operational characteristic information received from said third circuitry means and is readily usable by said means for executing operations and wherein there is further included gate circuitry means connected to said third circuitry means and connected to said first circuitry means and connected to said means for executing operations whereby information group signals are transmitted directly to said gate circuitry and whereby said information group signals are transmitted through said gate circuitry means, for further use by said means for executing operations in response to said operational characteristic indicating that such information group signals were not to be stored.

8. An arrangement for increasing the speed of executing program operations according to claim 3 wherein one of the operational characteristics defined by said two bits indicates that said information signals are not to be stored.

9. An arrangement for increasing the speed of executing program operations according to claim 7 wherein said third circuitry means includes a decoder device which decodes said second portion of said tag signals into one of a plurality of voltage conditions, each of which voltage conditions becomes a control signal to be applied to said information storage means to enable certain of said information storage means to accept information signals corresponding to the proper decoding of said second portion of said tag signals.

10. An arrangement for increasing the speed of executing program operations according to claim 9 wherein said gate circuitry means is connected to said means for executing operations and wherein one of said voltage conditions is applied to said gate circuitry means to permit said gate circuitry means to pass said information signals, without storage, directly to said means for executing operations.

* * * * *